US008606020B2

(12) United States Patent
Yamada et al.

(10) Patent No.: US 8,606,020 B2
(45) Date of Patent: Dec. 10, 2013

(54) SEARCH SKIP REGION SETTING FUNCTION GENERATION METHOD, SEARCH SKIP REGION SETTING METHOD, OBJECT SEARCH METHOD, SEARCH SKIP REGION SETTING FUNCTION GENERATION APPARATUS, SEARCH SKIP REGION SETTING APPARATUS, AND OBJECT SEARCH APPARATUS

(75) Inventors: Miki Yamada, Ome (JP); Yoshihiro Ohmori, Ome (JP); Kaoru Matsuoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/398,673

(22) Filed: Feb. 16, 2012

(65) Prior Publication Data
US 2012/0294538 A1   Nov. 22, 2012

(30) Foreign Application Priority Data
May 16, 2011   (JP) ................... 2011-109405

(51) Int. Cl.
*G06K 9/00* (2006.01)
(52) U.S. Cl.
USPC .......................... 382/218; 382/118
(58) Field of Classification Search
USPC .................... 382/100, 118, 218
See application file for complete search history.

(56) References Cited

U.S. PATENT DOCUMENTS

| 5,901,246 A * | 5/1999 | Hoffberg et al. ............. 382/209 |
| 7,222,306 B2 * | 5/2007 | Kaasila et al. ................. 715/801 |
| 7,873,221 B2 * | 1/2011 | Okada et al. .................. 382/209 |
| 2007/0276541 A1 * | 11/2007 | Sawasaki ....................... 700/253 |
| 2010/0054593 A1 * | 3/2010 | Matsushita et al. .......... 382/167 |
| 2011/0033092 A1 * | 2/2011 | Lee et al. ..................... 382/118 |

FOREIGN PATENT DOCUMENTS

| JP | 2003-022442 | 1/2003 |
| JP | 2003-036439 | 2/2003 |
| JP | 2003-346158 | 12/2003 |
| JP | 2006-301847 | 11/2006 |
| JP | 2007-094689 | 4/2007 |
| JP | 4387889 | 10/2009 |
| JP | 2010-224481 | 10/2010 |
| JP | 2011-514991 | 5/2011 |

OTHER PUBLICATIONS

Japanese Patent Application No. 2011-109405; Notification of Reasons for Refusal; Mailed May 22, 2012 (with English translation).
Yoshihiro Ohmori, "Fast Template Matching Using Adaptive Expansion", Image Lab, vol. 21, No. 5, Image Lab, Japan, Japan Industrial Publishing Co., Ltd., May 6, 2010, vol. 21.
Yoshihiro Ohmori, "Scale Free Active Search", IEICE Technical Report, vol. 109, No. 182, Japan, The Institute of Electronics, Information and Communication Engineers, Sep. 4, 2009, vol. 109.

\* cited by examiner

*Primary Examiner* — Shefali Goradia
(74) *Attorney, Agent, or Firm* — Blakely, Sokoloff, Taylor & Zafman LLP

(57) ABSTRACT

According to one embodiment, a search skip region setting function generation method includes estimating. The estimating includes estimating a relative position between a object and a template based on a distribution of surrounding search point similarities, and generates a function required to set a search skip region which allows to skip the object search on each model reduced-scale image based on the estimated relative position.

12 Claims, 15 Drawing Sheets

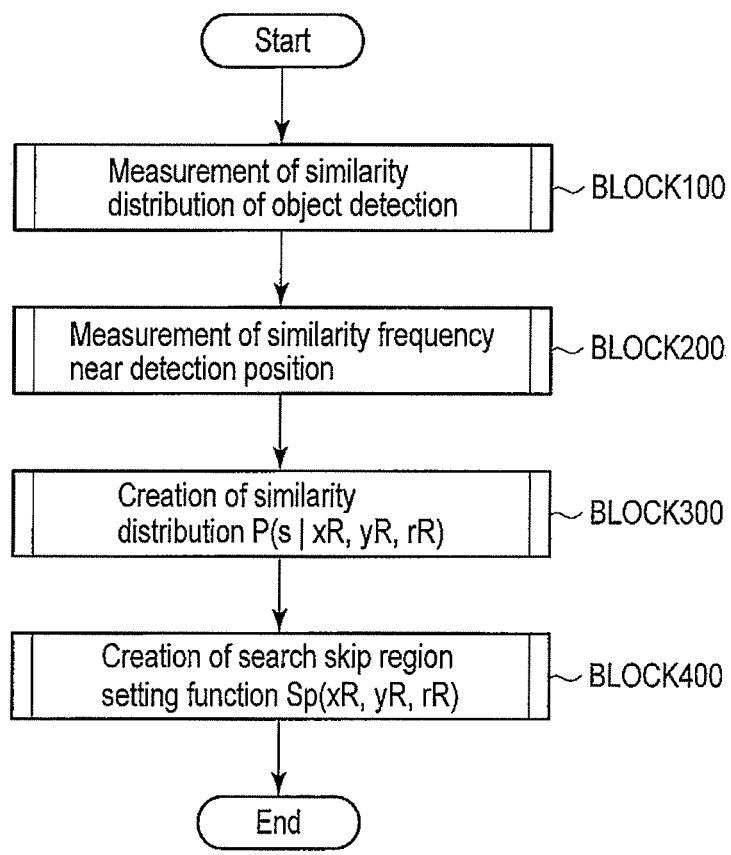
F I G. 1

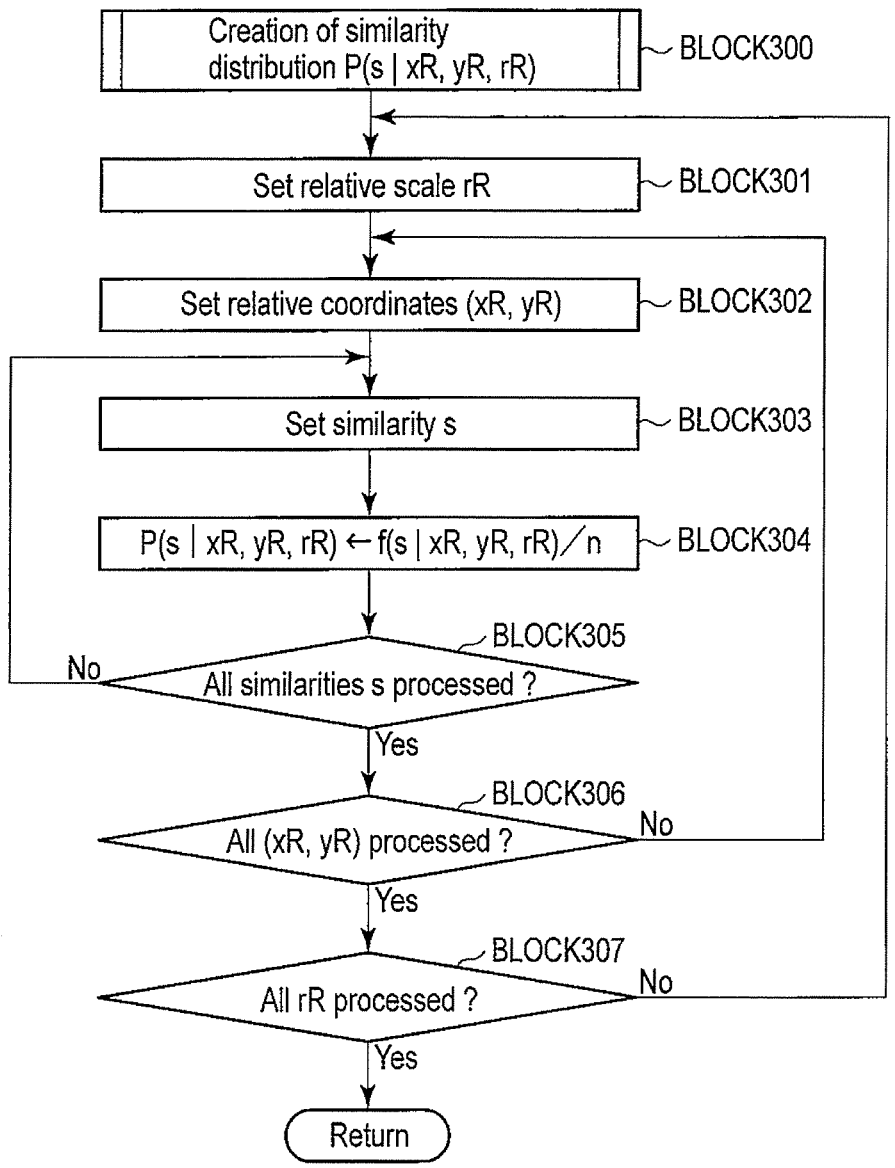
F I G. 4

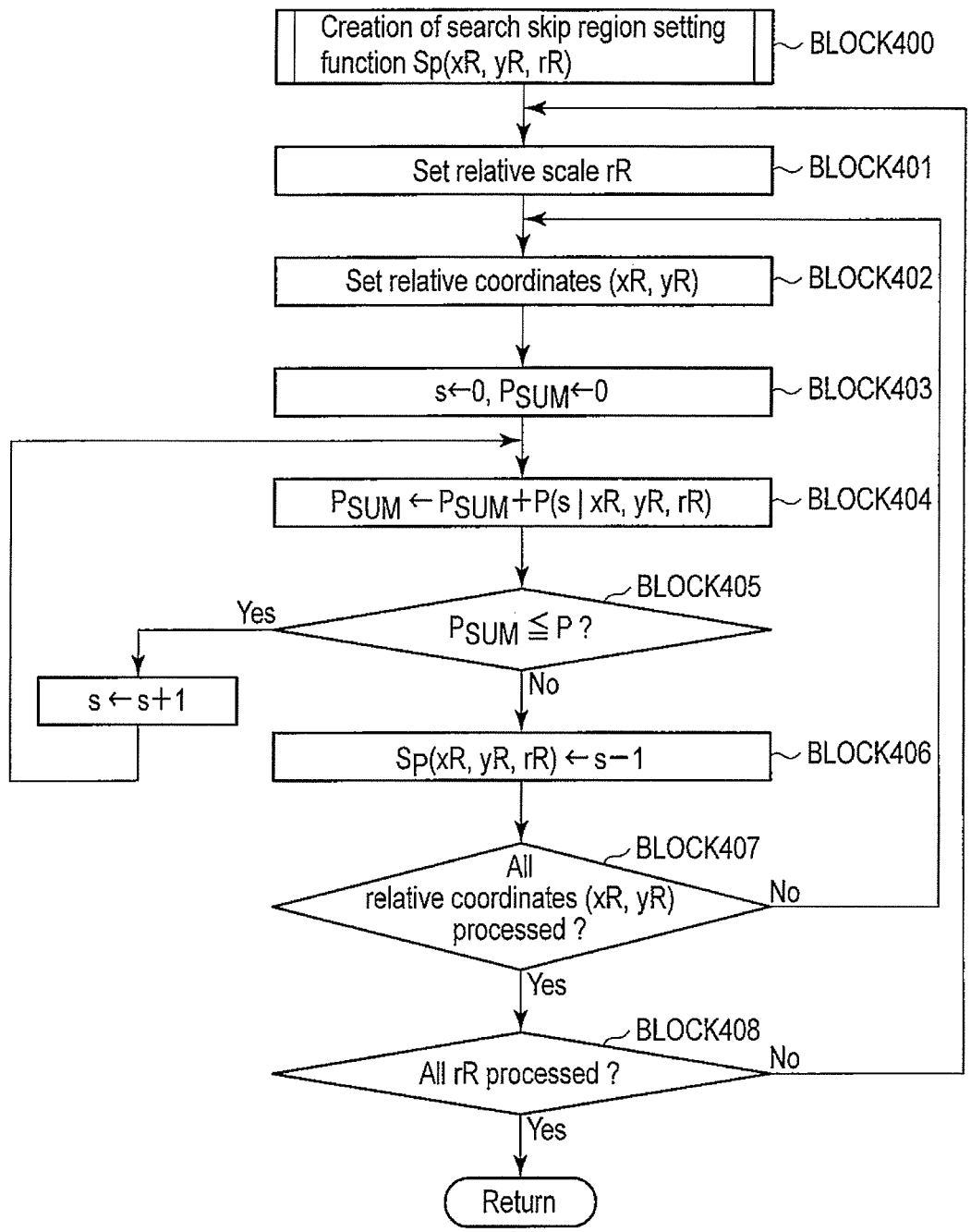
F I G. 5

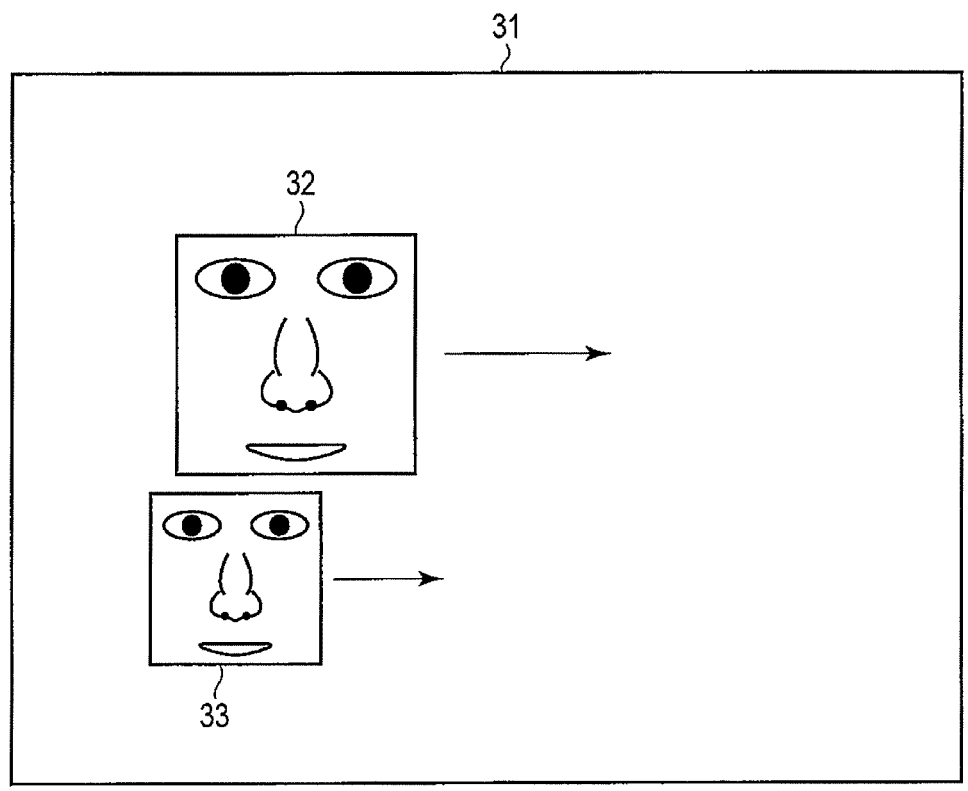
F I G. 8

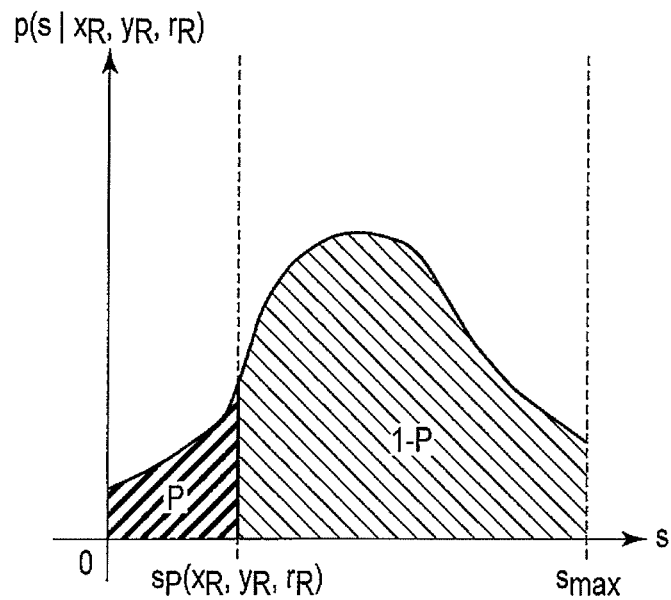
F I G. 10
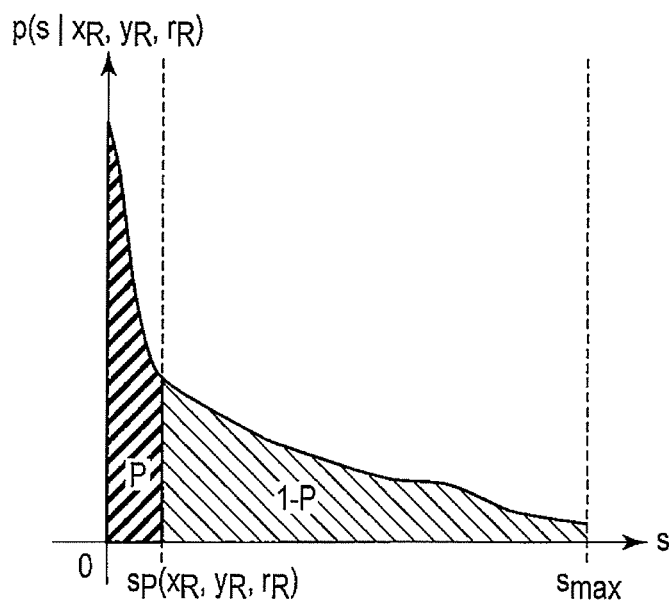
F I G. 11

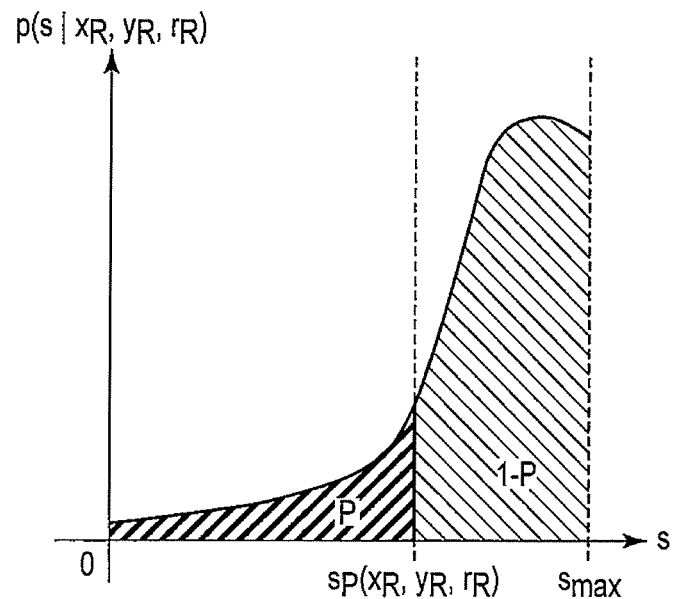
F I G. 1 2
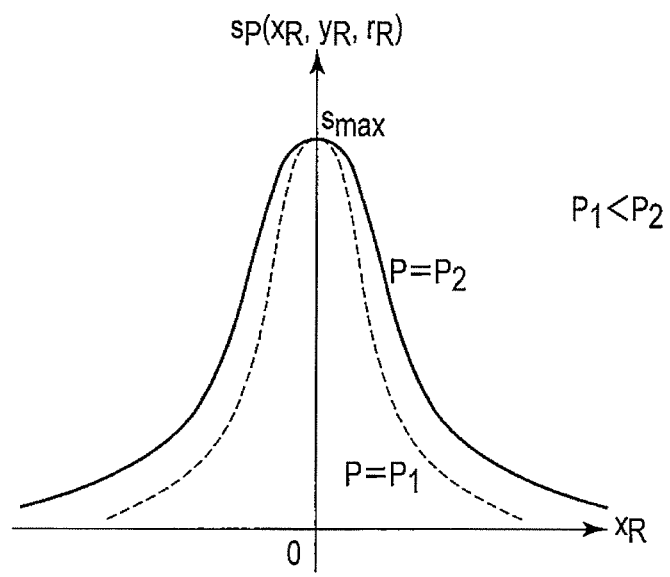
F I G. 1 3

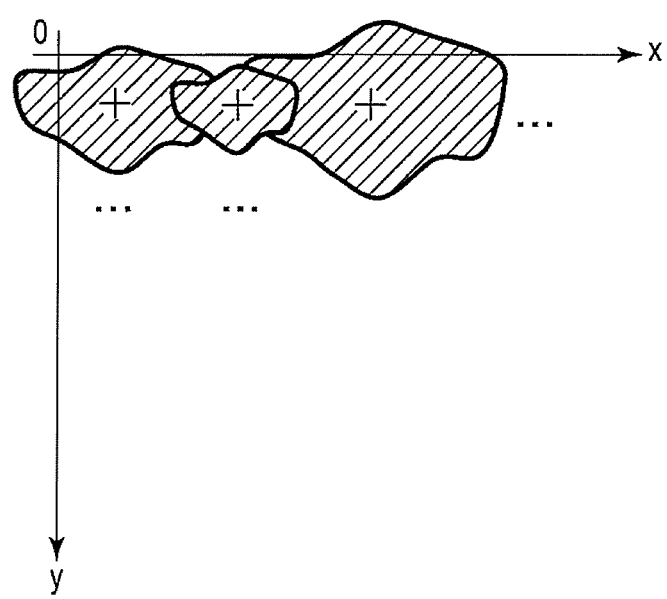
F I G. 16

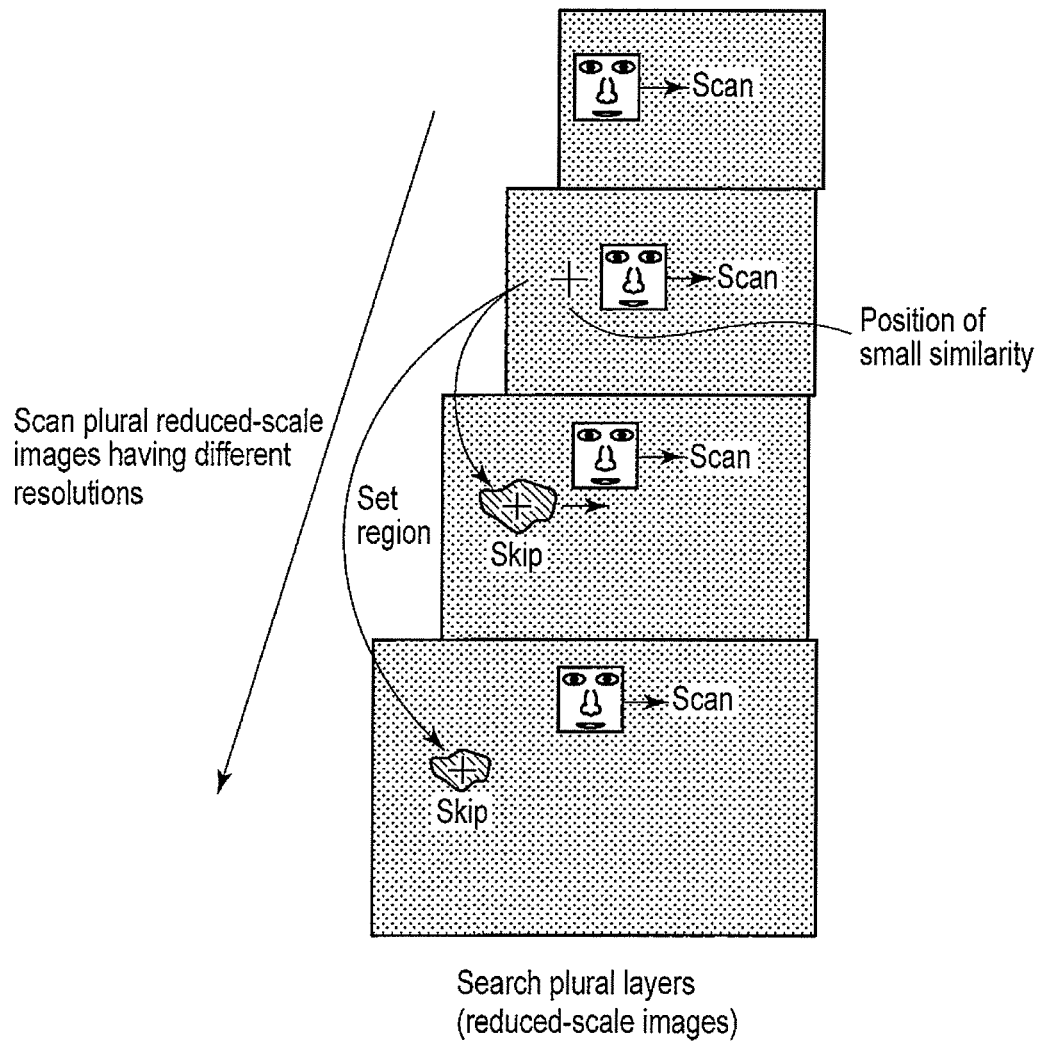
F I G. 17

SEARCH SKIP REGION SETTING FUNCTION GENERATION METHOD, SEARCH SKIP REGION SETTING METHOD, OBJECT SEARCH METHOD, SEARCH SKIP REGION SETTING FUNCTION GENERATION APPARATUS, SEARCH SKIP REGION SETTING APPARATUS, AND OBJECT SEARCH APPARATUS

CROSS-REFERENCE TO RELATED APPLICATIONS

This application is based upon and claims the benefit of priority from prior Japanese Patent Application No. 2011-109405, filed May 16, 2011, the entire contents of which are incorporated herein by reference.

FIELD

Embodiments described herein relate generally to a search skip region setting function generation method, search skip region setting method, object search method, search skip region setting function generation apparatus, search skip region setting apparatus, and object search apparatus.

BACKGROUND

In recent years, various techniques for detecting an object such as a human face from an image have been proposed. For example, the following object detection technique has been proposed. A template created from a reference image is overlaid on an object search target image, and is scanned. At respective overlaying positions, distances (or similar values or similarities) between the object search target image and template (or between feature amounts of the object search target image and those of the template) are computed. Subsequently, an overlaying position where a minimum distance is obtained (or an overlaying position where a maximum similarity between the object search target image and template is obtained) is output as an object detection position.

In order to accurately search for an object, for example, a template is shifted pixel by pixel with respect to an object search target image, and similarities between the object search target image and template are computed in correspondence with respective shift positions.

Also, an object size is often unknown. For this reason, a plurality of reduced-scale images having different sizes are prepared to assume an object, and an object search is conducted for the plurality of assumed reduced-scale images using a template.

However, with the above object search method, the computation load of the object search is heavy, resulting in high computation cost. That is, the object search load is heavy. Hence, an efficiency enhancement technique for the object search is demanded.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a flowchart showing an example of creation processing of a search skip region setting function;

FIG. 4 is a flowchart showing an example of creation processing of a similarity distribution in FIG. 1;

FIG. 5 is a flowchart showing an example of creation processing of a search skip region setting function in FIG. 1;

FIG. 8 is a view showing an example of the concept of object (face) detection;

FIG. 10 is a graph showing an example of the concept of a similarity distribution (density) $p(s|xR, yR, rR)$ at relative coordinates $(xR, yR, rR)$;

FIG. 11 is a graph showing an example of the concept of a similarity distribution (density) $p(s|xR, yR, rR)$ at positions separated away from an object detection position;

FIG. 12 is a graph showing an example of the concept of a similarity distribution (density) $p(s|xR, yR, rR)$ at positions near the object detection position;

FIG. 13 is a graph showing an example of the concept of a search skip region setting function $sP(xR, yR, rR)$;

FIG. 16 is a graph showing an example of the relationship between search points and search skip regions;

FIG. 17 is a view showing an example of the relationship between search processing for a plurality of reduced-scale images (those having different size ratios) and search skip regions;

DETAILED DESCRIPTION

Figure 2:
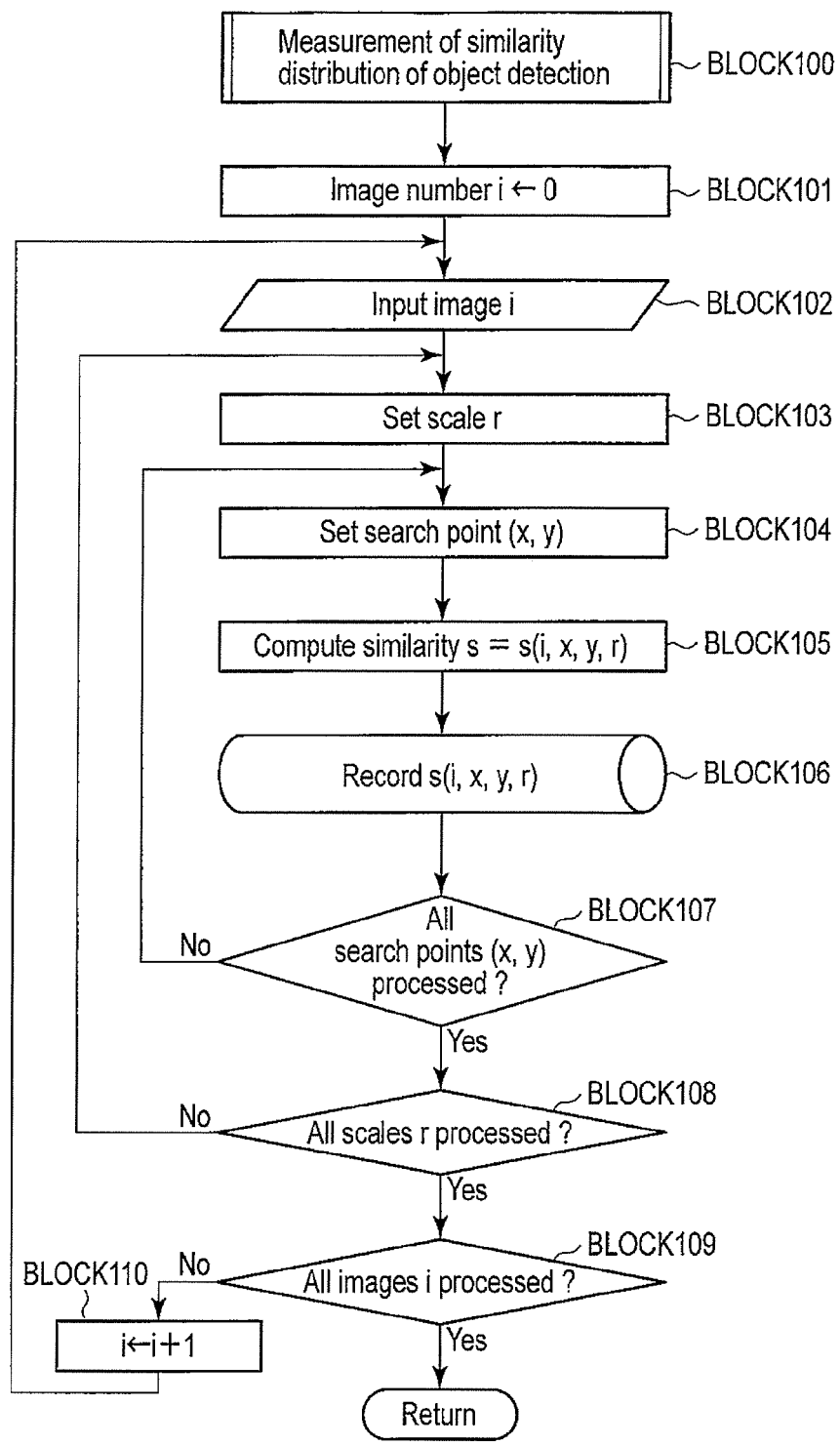
FIG. 2 is a flowchart showing an example of measurement processing of a similarity distribution of object detection.

Various embodiments will be described hereinafter with reference to the accompanying drawings.

In general, according to one embodiment, a search skip region setting function generation method includes associating, detecting, and estimating. The associating associates a template used to search for an object with a designated search point on each of model reduced-scale images having different size ratios, and detects a designated point similarity between the template and the designated search point on each model reduced-scale image. The detecting detects, if the designated search point similarity exceeds an object detection determination threshold, surrounding search point similarities between the template and a plurality of surrounding search points around the designated search point on each model reduced-scale image. The estimating estimates a relative position between the object and the template based on a distribution of the surrounding search point similarities, and generates a function required to set a search skip region which allows to skip the object search on each model reduced-scale image based on the estimated relative position.

For example, prior to an object search, an object search skip region setting function generation method or object search skip region setting function generation apparatus (to be simply referred to as a function generation method or function generation apparatus hereinafter) according to this embodiment measures, using learning reduced-scale images (model reduced-scale images) having different size ratios and a template (for example, that of one size), similarity distributions of the respective learning reduced-scale images, computes similarity distributions near an object in all the learning reduced-scale images based on the measured similarities (learning result), and generates a search skip region setting function based on the computed similarity distributions. Generation processing of a function by the function generation method or function generation apparatus will be described in detail later with reference to, for example, FIGS. 1, 2, 3, 4, and 5.

"Learning" in object detection usually means creation of so-called templates, optimal feature amounts, and dictionaries used in a search using collected object images. However, in this specification, "learning" indicates measurements of similarity distributions on reduced-scale images and computation of a search skip region setting function using already created templates, dictionaries, and the like.

Also, an object search skip region setting method or object search skip region setting apparatus (to be simply referred to as a search method or search apparatus hereinafter) according to this embodiment efficiently sets search skip regions on respective object search target reduced-scale images having different size ratios using information of the size ratios and the like based on the search skip region setting function. For example, the search method or search apparatus sets a first search skip region on a first object search target reduced-scale image of a plurality of object search target reduced-scale images having different size ratios (for example, a smallest object search target reduced-scale image of the plurality of object search target reduced-scale image) based on the search skip region setting function (a setting method of the first search skip region will be described in detail later). Subsequently, the search method or search apparatus sets a second search skip region on a second object search target reduced-scale image using, for example, information of a size ratio between the first and second object search target reduced-scale images.

More specifically, the search method or search apparatus sets, based on a first reference point (or search point) on the first object search target reduced-scale image and information of the size ratio between the first and second object search target reduced-scale images, a second reference point corresponding to the first reference point on the second object search target reduced-scale image, and sets a size of a search skip region, which is set on the second object search target reduced-scale image with reference to the second reference point, based on a similarity between a template and the first reference point on the first object search target reduced-scale image. Setting processing of a search skip region by the search method or search apparatus will be described in detail later.

An object search method or object search apparatus (to be simply referred to as a search method or search apparatus hereinafter) according to this embodiment searches respective object search target reduced-scale images for an object using a template (for example, that of one size) by excluding search skip regions set on the object search target reduced-scale images having different size ratios. That is, the search method or search apparatus excludes the search skip region set on the first object search target reduced-scale image, and searches the object search target reduced-scale image for an object using the template. Also, the search method or search apparatus excludes the search skip region set on the second object search target reduced-scale image, and searches the second object search target reduced-scale image for an object using the template. Setting processing of the search skip region by the search method or search apparatus will be described in detail later.

Figure 7:
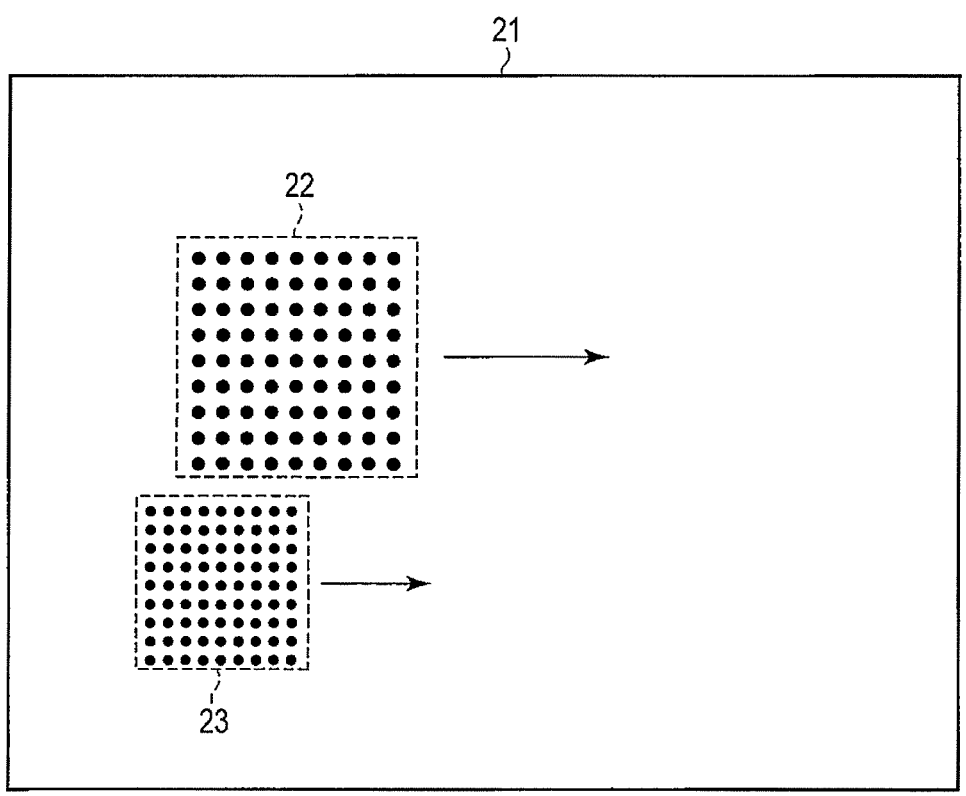
FIG. 7 is a view showing an example of the concept of an object search.

When an object is detected from, for example, a television broadcast video signal, an object size is not normally known in advance. For this reason, a plurality of reduced-scale images having different size ratios are created, and a search (or scan) is conducted for the plurality of created reduced-scale images using a template (for example, that of one size) (see FIGS. 7 and 8).

Figure 9:
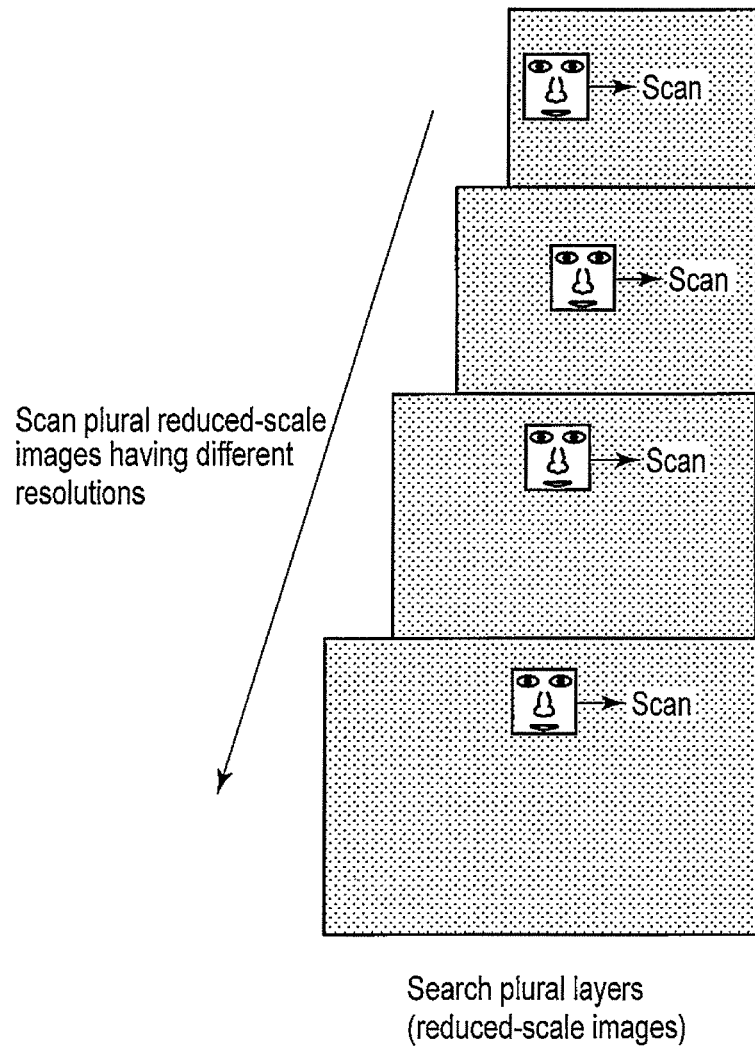
FIG. 9 is a view showing an example of the concept of object (face) detection for a plurality of reduced-scale images (those having different size ratios)

In actual processing, a plurality of reduced-size images (a plurality of object search target reduced-scale images having different size ratios) are created by reducing an object search target image at different reduction ratios, and the plurality of reduced-scale images are searched for an object using a template of a given size (see FIG. 9). The object search skip region setting function generated by this embodiment can effectively set search skip regions in such case.

Figure 6:
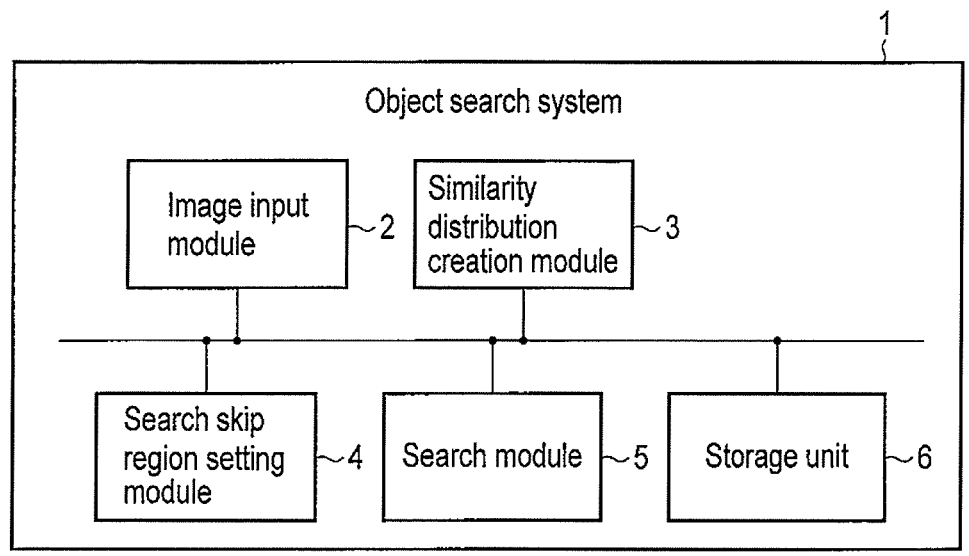
FIG. 6 is a block diagram showing an example of an object search system.

For example, an object search system 1 shown in FIG. 6 corresponds to the function generation apparatus, and generates the search skip region setting function. Also, the object search system 1 corresponds to the region setting apparatus, and sets a search skip region on each object search target reduced-scale image based on the search skip region setting function. Furthermore, the object search system 1 corresponds to the search apparatus, and searches respective object search target reduced-scale images for an object using a template by excluding the search skip regions.

All of the creation processing of a search skip region setting function, the setting processing of a search skip region, and the object search need not be implemented by a single device. For example, a computer creates a search skip region setting function. An image processing device such as a digital TV mounts an object search function based on the search skip region setting function, and searches for an object by the object search function. That is, the image processing device generates a plurality of object search target reduced-scale images having different size ratios from a program video picture (an object search target image of a reference size), sets search skip regions on the respective object search target reduced-scale images, and searches the respective object search target reduced-scale images for an object using a template by excluding the search skip regions of the respective object search target reduced-scale images.

An example of the creation processing of a search skip region setting function, the setting processing of a search skip region, and the object search by the object search system 1 shown in FIG. 6 will be described below. As shown in FIG. 6, for example, the object search system 1 includes an image input module 2, a similarity distribution creation module 3, a search skip region setting module 4, a search module 5, and a storage unit 6.

FIG. 1 is a flowchart showing an example of creation processing of a search skip region setting function.

Initially, an example of measurement processing of a similarity distribution of object detection (BLOCK 100) in FIG. 1 will be described with reference to the flowchart shown in FIG. 2.

For example, the image input module 2 of the object search system 1 initializes an image number i (BLOCK 101). The image input module 2 sequentially inputs a plurality of learning images (model images), designates the image number i for each learning image, sets a scale r of reduction processing for the learning image i, sets a scale r as a size ratio to the learning image i as a non-reduced input image, creates a learning reduced-scale image (model reduced-scale image), and selects a learning reduced-scale image having a smallest scale r (a reduced scale image of the image number i) as a first learning reduced-scale image (a reduced scale image of the image number i) (BLOCK 103). The similarity distribution creation module 3 sets a scale r (BLOCK 103), sets a search point (x, y) (BLOCK 104), computes a similarity s at the search point (BLOCK 105), and records the similarity s (BLOCK 106).

That is, the similarity distribution creation module 3 scans the first learning reduced-scale image using a template to search for an object. For example, the similarity distribution creation module 3 associates a template used to search the first learning reduced-scale image for an object with a first designated search point on the first learning reduced-scale image to have a first positional relationship, and detects a first designated search point similarity (similarity s) between the template and the first designated search point on the first learning reduced-scale image.

The similarity detection processing is executed for all learning reduced-scale images and all search points (BLOCK 107, BLOCK 108, BLOCK 109, BLOCK 110).

Figure 3:
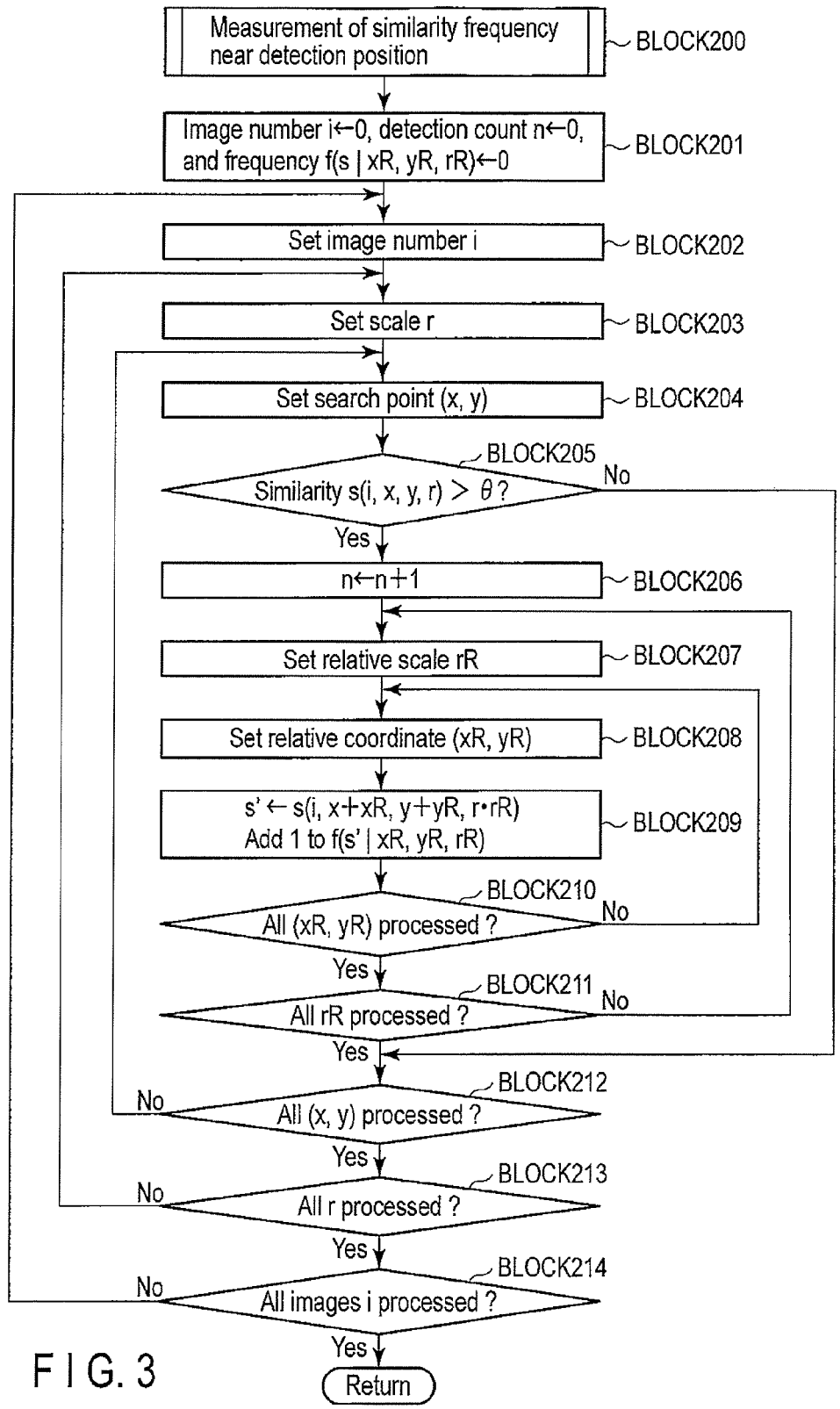
FIG. 3 is a flowchart showing an example of measurement processing of a similarity frequency near a detection position in FIG. 1.

An example of the measurement processing of a similarity frequency near a detection point (BLOCK 200) in FIG. 1 will be described below with reference to the flowchart shown in FIG. 3.

For example, the similarity distribution creation module 3 of the object search system 1 initializes an image number i, detection count n, and frequency f (s|xR, yR, rR) (BLOCK 201), sets an image number i, scale r, and search point (x, y) (BLOCK 202, BLOCK 203, BLOCK 204), and compares a similarity s at the search point with a detection threshold θ. In this case, the value of the scale r is associated with the size of a reduced-scale image. Execution of processing while setting n different scales r means to process n reduced-scale images having different sizes.

If the first designated search point similarity (similarity s) does not exceed the detection threshold θ (object detection determination threshold θ) (NO in BLOCK 205), the similarity distribution creation module 3 changes the first designated search point (BLOCK 204), associates the template used to search this first learning reduced-scale image for an object with a second designated search point on the first learning reduced-scale image to have a second positional relationship, and detects a second designated search point similarity (similarity s) between the template and the second designated search point on the first learning reduced-scale image.

If the second designated search point similarity (similarity s) does not exceed the detection threshold θ (object detection determination threshold θ), the similarity distribution creation module 3 changes the second designated search point and continues similarity detection. If the second designated search point similarity (similarity s) exceeds the detection threshold θ (object detection determination threshold θ), the similarity distribution creation module 3 determines that an object detected in the second positional relationship.

As described above, if the similarity s exceeds the detection threshold θ (object detection determination threshold θ) (YES in BLOCK 205), the similarity distribution creation module 3 determines that an object is detected, and computes similarities near the detection position. The similarity distribution creation module 3 executes processing for adding a frequency f( ) associated with relative coordinates (xR, yR) from the object detection position, a relative scale rR, and the similarity s for all relative scales and all relative coordinates (BLOCK 206 to BLOCK 212). The scale r is a ratio between sizes of a non-reduced original learning image and a learning reduced-scale image (for example, the first learning reduced-scale image), and r increases with decreasing size of the learning reduced-scale image. The relative scale rR represents a ratio between scales r of two learning reduced-scale images.

For example, if the first designated search point similarity (similarity s) exceeds the detection threshold θ (object detection determination threshold θ) in the first positional relationship, the similarity distribution creation module 3 detects surrounding search point similarities between the template and a plurality of first surrounding search points around the first designated search point on the first learning reduced-scale image of the first positional relationship.

Upon completion of measurement of a similarity frequency for the first learning reduced-scale image in this way, the similarity distribution creation module 3 then measures the aforementioned similarity frequency for a second learning reduced-scale image having a different scale r (BLOCK 203 to BLOCK 213). After that, the similarity distribution creation module 3 similarly measures the aforementioned similarity frequencies for learning reduced-scale images of all scales r (BLOCK 203 to BLOCK 213). Furthermore, the similarity distribution creation module 3 measures the aforementioned similarity frequencies for all the learning images i (BLOCK 202 to BLOCK 214).

A plurality of types of templates are prepared, and the similarity distribution creation module 3 can measure similarity frequencies using the respective templates. The plurality of types of templates are, for example, those required to detect different objects.

The template will be supplemented. A template used to detect a face (object) means dictionary patterns of a subspace method, which respectively correspond to a face, eyes, and nose, as described in, for example, Jpn. Pat. Appln. KOKAI Publication No. 2003-346158. Alternatively, a template used to detect a face (object) is a model which expresses static features of each individual face of registered face images using sets of allocations of preset feature points and image feature amounts near these feature points, as described in, for example, Jpn. Pat. Appln. KOKAI Publication No. 2007-249394. Alternatively, a template used to detect a face (object) is a set of model data H including pieces of information (for example, Gabor wavelet coefficients) CA(x−) of images near feature points plotted on a registered face image, pieces of feature point allocation information x−, and person IDn, as described in, for example, Jpn. Pat. Appln. KOKAI Publication No. 2005-208850. Note that the template may be the aforementioned dictionary patterns or model data, or may be an image (template image).

An example of creation processing of a similarity distribution (BLOCK 300) in FIG. 1 will be described below with reference to the flowchart shown in FIG. 4.

The similarity distribution creation module 3 executes processing for computing P( ) by dividing the frequency f( ) computed in BLOCK 200 by the detection count n for all relative scales, all relative coordinates, and all similarities (BLOCK 301 to BLOCK 307). FIGS. 10, 11, and 12 are graphs showing examples of the concept of P(s|xR, yR, rR). When positions are closer to an object position, a region having greater similarities s has a higher frequency, as shown in FIG. 12. When positions are farther away from an object position, a region having smaller similarities s has a higher frequency, as shown in FIG. 11.

An example of creation processing of a search skip region setting function (BLOCK 400) in FIG. 1 will be described below with reference to the flowchart shown in FIG. 5.

The similarity distribution creation module 3 executes processing for cumulatively adding s from s=0 to s=P(s|xR, yR, rR), and setting s immediately before a detection error ratio P (allowable detection error ratio P) is exceeded to be SP(xR, yR, rR) for all relative scales rR and relative coordinates (xR, yR) (BLOCK 401 to BLOCK 408), and the similarity distribution creation module 3 generates a search skip region setting function SP(xR, yR, rR).

That is, the similarity distribution creation module 3 estimates distances between an object and template based on the aforementioned surrounding search point similarity distribution, and generates a search skip region setting function used to set a search skip region based on the estimated distances. In this case, the distance means a relative position, and a criterion of the distance changes depending on directions. That is, the similarity distribution creation module 3 estimates object detection error ratios at the first surrounding search points based on the estimated distances (estimated relative positions), and generates the search skip region setting function based on the estimated detection error ratios. More specifically, the similarity distribution creation module 3 generates a search skip region setting function which compares the allowable detection error ratio that allows object detection errors and the estimated detection error ratios, and sets a region where the estimated detection error ratios are less than the allowable detection error ratio as a search skip region.

A theoretical rationale that can set a search skip region will be supplemented. If a very small similarity is observed at a position (xF, yF) and scale rF, it is estimated that no object exists at the very vicinity of that position. This embodiment uses the following logic. That is, when this idea is considered as a proposition in a logic, if the proposition is true, its contraposition is also true. A contraposition of "if it is A, it is B" is defined as "if it is not B, it is not A", and it is understood that a contraposition of a true proposition is true. Using this logic, if "when an object is detected at (xF, yF) and scale rF, a similarity at (x, y) and scale r is s>s(x−xF, y−yF, rF/r)" is true, it is concluded that "if a similarly at (x, y) and scale r is s≤s(x−xF, y−yF, rF/r), an object is not detected at (xF, yF) and scale rF" as its contraposition is also true. In general, a similarity distribution has a broad distribution pattern, and it is difficult to determinably estimate the presence/absence of an adjacent object using a similarity. Hence, the detection error ratio P is designated to correct the aforementioned proposition. That is, the proposition is "when an object is detected at (xF, yF) and scale rF, a similarity at (x, y) and scale r is s>s(x−xF, y−yF, rF/r) at a probability of 1−P", and its contraposition is "if a similarly at (x, y) and scale r is s≤s(x−xF, y−yF, rF/r), an object is not detected at (xF, yF) and scale rF at a probability of 1−P". The similarity distribution creation module 3 computes SP(xR, yR, rR) corresponding to s(x−xF, y−yF, rF/r) above when the detection error ratio P, relative coordinates, and size ratio are designated.

FIG. 13 is a graph showing an example of the concept of SP(xR, yR, rR). When a detection error ratio P (allowable detection error ratio P) is small, a curve approaches the center, thus narrowing down a search skip region. Conversely, when the detection error ratio P (allowable detection error ratio P) is large, the curve is separated away from the center, thus broadening a search skip region. For example, when a sufficiently low possibility of object detection errors is to be set, the allowable detection error ratio P is set to be a vary small value (for example, 0%<P<5%), and a search skip region is narrowed down, thus setting a low possibility of object detection errors. When importance is attached to a reduction of an object search load rather than a lower possibility of object detection errors, the allowable detection error ratio P is set to be a relatively low value (for example, 5%≤P<10%), and a search skip region is broadened, thus reducing the object search load while preventing object detection errors.

Figure 14:
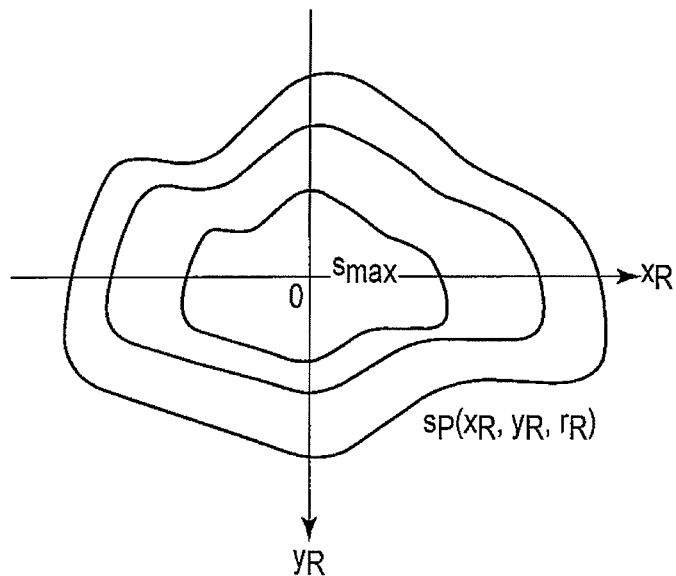
FIG. 14 is a graph showing an example of the concept of the search skip region setting function $sP(xR, yR, rR)$.

FIG. 14 is a graph showing an example of the concept used to explain the search skip region setting function SP(xR, yR, rR). FIG. 14 shows an example of lower limits of similarities at relative coordinates from an object detection position (0, 0) (to have the detection error ratio P). FIG. 14 shows a hill-like shape having the center as a top peak. When an object is detected at a scale r and coordinates (x, y), a similarity at a scale r·rR and coordinates (x+xR, y+yR) is greater than or equal to SP(xR, yR, rR) at a probability of 1−P.

Figure 15:
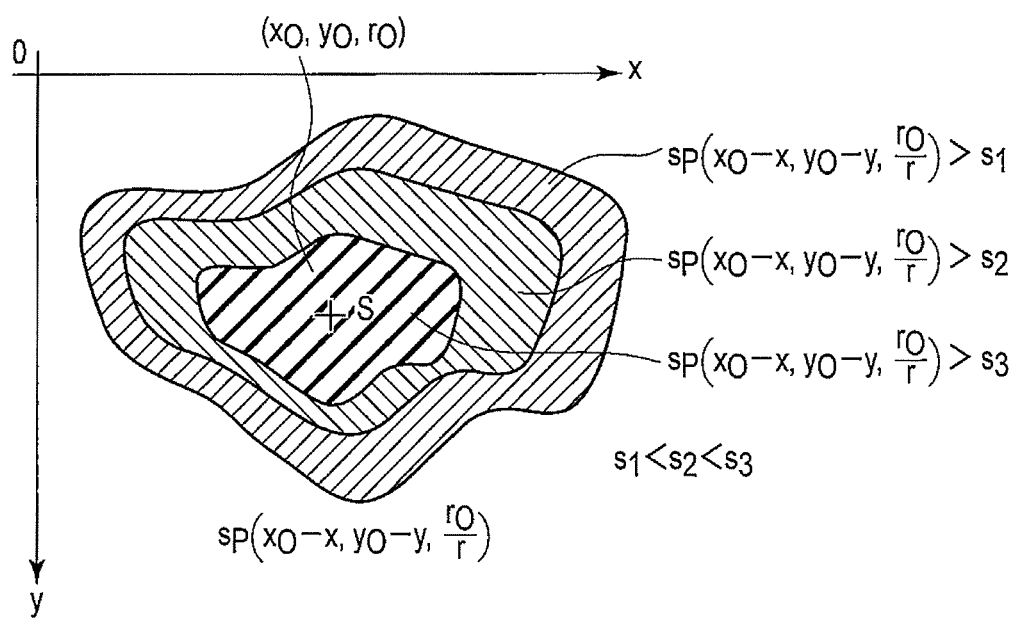
FIG. 15 is a graph showing an example of the concept of the relationship between the search skip region setting function $sP(xR, yR, rR)$ and a search skip region.

FIG. 15 shows an example of a graph obtained by inverting FIG. 14 in association with x and y. When a similarity s is obtained at a certain scale r0 and a certain position (x0, y0), letting rR be a relative scale and (xR, yR) be relative coordinates from that position, an object detection probability in a region of SP(−xR, −yR, 1/rR)>s is less than or equal to the detection error ratio P (allowable detection error ratio P). Therefore, by setting the detection error ratio P (allowable detection error ratio P) to be a sufficiently small value, a search in this region is skipped to reduce a search computation volume.

The aforementioned mathematical definitions will be summarized below.

$s$:Similarity (1)

$P(s|x_R,y_R,r_R)$:Similarity distribution at $(x_R,y_R,r_R)$ (2)

$p(s|x_R,y_R,r_R)$:Similarity distribution (density) at $(x_R, y_R, r_R)$ (3)

$P$:Detection error ratio (4)

$s_P(x_R,y_R,r_R)$:Similarity threshold according to detection error $P$ (5)

$s \leq s_P(x_R,y_R,r_R)$:Search skip region (6)

$$\int_0^s p(s|x_R, y_R, r_R)ds = 1 \quad (7)$$

$$\sum_{s=0}^{s_{max}} P(s|x_R, y_R, r_R) = 1 \quad (8)$$

$$\sum_{s=0}^{s_P(x_R,y_R,r_R)} P(s|x_R, y_R, r_R) = P < 1 \quad (9)$$

FIG. 16 is a graph showing an example of the concept of a search. A "+" mark in FIG. 16 indicates a search point. The search skip region setting module 4 sets search skip regions (hatched regions in FIG. 16) near the search points after search similarity computation.

For example, the image input module 2 inputs an object search target image (for example, a program image) used as a reference. The search module 5 generates a plurality of object search target reduced-scale images having different size ratios, associates a first object search target reduced-scale image with a template to have a predetermined positional relationship (to associate the template with a first designated search point on the first object search target reduced-scale image), and detects a designated search point similarity between the template and the first designated search point on the first object search target reduced-scale image. The search skip region setting module 4 receives information of similarities, positions, and scales from the search module 5, as needed, and sets a search skip region in the vicinity of the first designated search point on the object search target reduced-scale image based on a search skip region setting function.

Since a search skip region corresponding to one search point depends on similarities, allocations of search points have to be dynamically set.

A method of efficiently setting search skip regions on a plurality of object search target reduced-scale images will be described below with reference to FIG. 17. The search skip region setting module 4 associates the template with a first reference point (+) on the first object search target reduced-scale image of the plurality of object search target reduced-scale images having different size ratios based on the search skip region setting function. When a similarity between the template and a predetermined region including the first reference point of the first object search target reduced-scale image is lower than a threshold (when there is no object near the first reference point), the search skip region setting module 4 sets a first search skip region on the first object search target reduced-scale image based on the first reference point and similarity.

Furthermore, the search skip region setting module 4 sets a second search skip region on a second object search target reduced-scale image based on a size ratio (to be referred to as a first size ratio hereinafter) between the first and second object search target reduced-scale images. More specifically, the search skip region setting module 4 computes a coordinate value of a second reference point corresponding to the first reference point based on the coordinate value of the first reference point and the first size ratio, sets the second reference point on the second object search target reduced-scale image, computes a size of the second search skip region based on the similarity between the first reference point and template, and sets the second search skip region on the second object search target reduced-scale image with reference to the second reference point.

As described above, after the similarity computation of a search point (first reference point) on the first object search target reduced-scale image of the plurality of object search target reduced-scale images having different size ratios, the search skip region setting module 4 sets a search skip region (hatched region) near the search point. Furthermore, the search skip region setting module 4 sets a search skip region (hatched region) on the second object search target reduced-scale image having a scale different from the first object search target reduced-scale image with reference to the scale information.

In order to efficiently conduct an object search, the search skip region setting module 4 starts processing from the first object search target reduced-scale image having a smallest size of the plurality of object search target reduced-scale images having different size ratios. Assuming that the template has a constant size, a relative size of the template to the first object search target reduced-scale image is large. Conversely, the relative size of the template to an $n^{th}$ object search target reduced-scale image having a largest size is small. That is, scanning the template for the first object search target reduced-scale image is to search for an object having a large size, and scanning the template for the $n^{th}$ object search target reduced-scale image is to search for an object having a small size.

An object having a large size is normally important, and a work load on scanning the template for the first object search target reduced-scale image is lighter than that on scanning the template for the $n^{th}$ object search target reduced-scale image. From such situation, the efficiency can be enhanced by starting processing from the first object search target reduced-scale image of the smallest size of the plurality of object search target reduced-scale images. That is, a search skip region is basically set on the first object search target reduced-scale image by template scanning, and search skip region setting processing using the similarity computation result for the first object search target reduced-scale image can be applied to object search target reduced-scale images other than the first object search target reduced-scale image by locally skipping template scanning and using the size ratio information.

Figure 18:
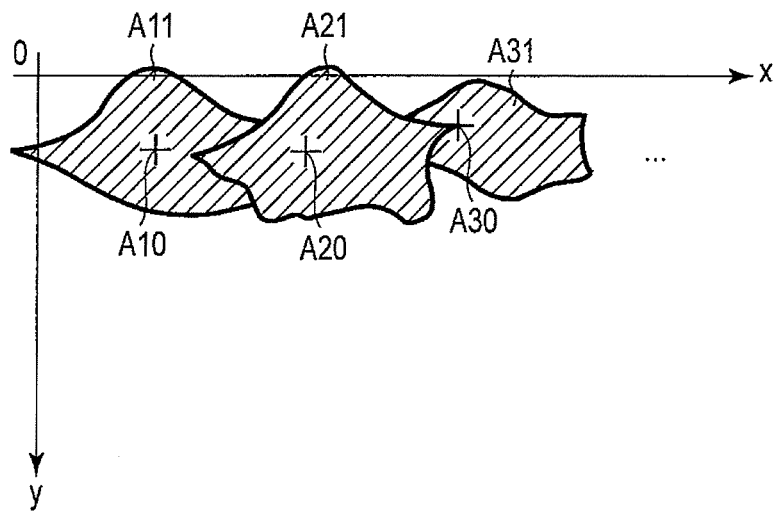
FIG. 18 is a graph showing an example of a setting order of search skip regions on an object search target reduced-scale image.

A sequence for setting a plurality of search skip regions on an object search target reduced-scale image of one size will be described below. For example, as shown in FIG. 18, the search skip region setting module 4 computes similarities between a template and a first designated search point A10 and a plurality of surrounding search points on an object search target reduced-scale image, and sets a first search skip region A11 based on the search skip region setting function in correspondence with these similarities. Next, the search skip region setting module 4 computes similarities between the template and a second designated search point A20 (which is located outside the first search skip region A11 and is adjacent to the first search skip region A11) and a plurality of surrounding search points, and sets a second search skip region A21 based on the search skip region setting function with reference to the second designated search point A20 in correspondence with these similarities. Then, the search skip region setting module 4 computes similarities between the template and a third designated search point A30 (which is located outside the first and second search skip regions A11 and A21, is farthest from the first search skip region A11, and is adjacent to the second search skip region A21) and a plurality of surrounding search points, and sets a third search skip region A31 based on the search skip region setting function with reference to the third designated search point A30 in correspondence with these similarities. In this way, the search skip region setting module 4 can set one or more search skip regions on the object search target reduced-scale image.

Figure 19:
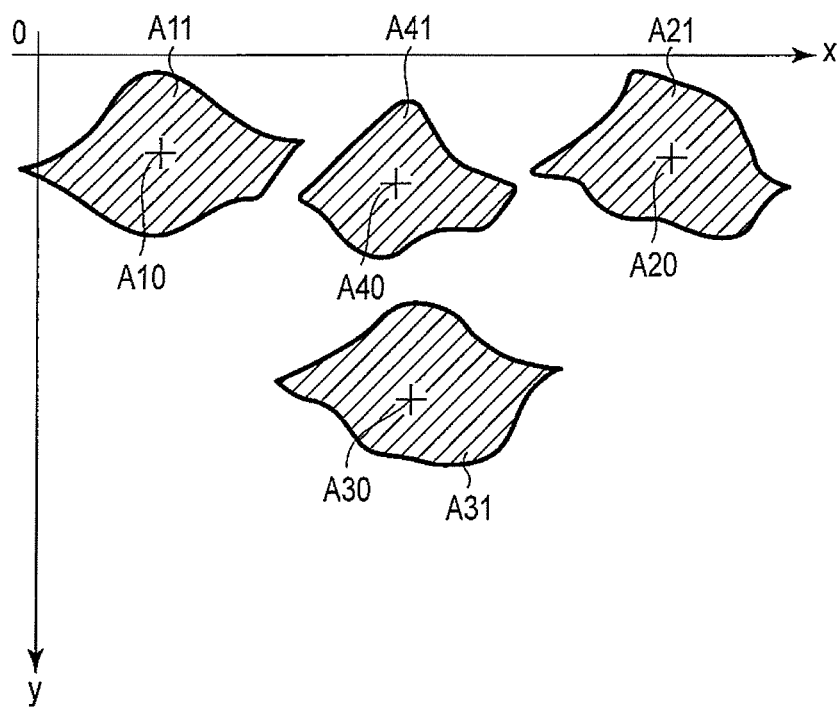
FIG. 19 is a graph showing an example of a setting order of search skip regions on an object search target reduced-scale image.

Alternatively, as shown in FIG. 19, the search skip region setting module 4 computes similarities between the template and a first designated search point A10 and a plurality of surrounding search points on the first object search target reduced-scale image, and sets a first search skip region A11 based on the search skip region setting function with reference to the first designated search point A10 in correspondence with these similarities. Next, the search skip region setting module 4 computes similarities between the template and a second designated search point A20 (which is located outside the first search skip region A11 and is separated by a predetermined distance or more from the first search skip region A11) and a plurality of surrounding search points, and sets a second search skip region A21 based on the search skip region setting function with reference to the second designated search point A20 in correspondence with these similarities. Then, the search skip region setting module 4 computes similarities between the template and a third designated search point A30 (which is located outside the first and second search skip regions A11 and A21 and is separated by a predetermined distance or more from the first and second search skip regions A11 and A21) and a plurality of surrounding search points, and sets a third search skip region A31 based on the search skip region setting function with reference to the third designated search point A30 in correspondence with these similarities. In this manner, the search skip region setting module 4 can set one or more search skip regions on the object search target reduced-scale image as a first stage. Furthermore, the search skip region setting module 4 computes similarities between the template and a fourth designated search point A40 (which is located outside the first, second, and third search skip regions A11, A21, and A31, that is, which is farthest from the respective regions) and a plurality of surrounding search points, and sets a fourth search skip region A41 based on the search skip region setting function with reference to the fourth designated search point A40 in correspondence with these similarities. In this manner, the search skip region setting module 4 can set one or more search skip regions on the object search target reduced-scale image as a second stage. The search skip region setting module 4 can efficiently set a plurality of search skip regions on the object search target reduced-scale image by repeating the aforementioned processes.

As described above, the search skip region setting module 4 sets a plurality of search skip regions to cover the object search target reduced-scale image. Subsequently, the search module 5 conducts an object search for an excluded region, obtained by excluding the search skip regions from an object search target reduced-scale image region. That is, the search module 5 overlays and scans the template on the excluded region obtained by excluding the search skip regions from the object search target reduced-scale image region, thus searching for an object. Furthermore, the search module 5 sends information of similarities, positions, and scales based on the similarities detected at the time of the search to the search skip region setting module 4, which additionally sets search skip regions to a plurality of object search target reduced-scale images, as needed. Thus, compared to a case in which an object search is conducted while shifting the template pixel by pixel for the entire region of an object search target reduced-scale image, the object search can be conducted efficiently.

According to the object search skip region setting method of this embodiment, object search processing can be speeded up while suppressing object detection errors.

The concept upon speeding up the object search processing will be summarized below.

In order to detect an object (human face) from an object search target image, similarities between a template and search points of all positions on the object search target image are computed. Since an object size is not known in advance, similarities are computed using a plurality of templates of a plurality of sizes. Alternatively, a plurality of object search target reduced-scale images having different size ratios are generated, and similarities are computed for these plurality of object search target reduced-scale images using a template. Such computation becomes huge, resulting in a heavy load.

Hence, a search skip region is set on the first object search target reduced-scale image of the plurality of object search target reduced-scale images having different size ratios. If a similarity at a certain search point on the first object search target reduced-scale image is low, an object does not exist around this search point with high possibility. Using this possibility, a search skip region is set on the first object search target reduced-scale image. Furthermore, search skip regions are set on the second, third, . . . , $n^{th}$ object search target reduced-scale images using information of the size ratios.

Then, the search skip regions are excluded from the first, second, third, . . . , $n^{th}$ object search target reduced-scale images, and an object search is conducted for the first, second, third, . . . , $n^{th}$ object search target reduced-scale images. Alternatively, based on the first, second, third, . . . , $n^{th}$ object search target reduced-scale images set with the search skip regions, an object search reduced-scale image of one size, to which the search skip regions are reflected, is generated, and an object search is conducted for the object search reduced-scale image of one size by excluding the search skip regions of that image.

In this way, the object search processing can be speeded up.

Figure 20:
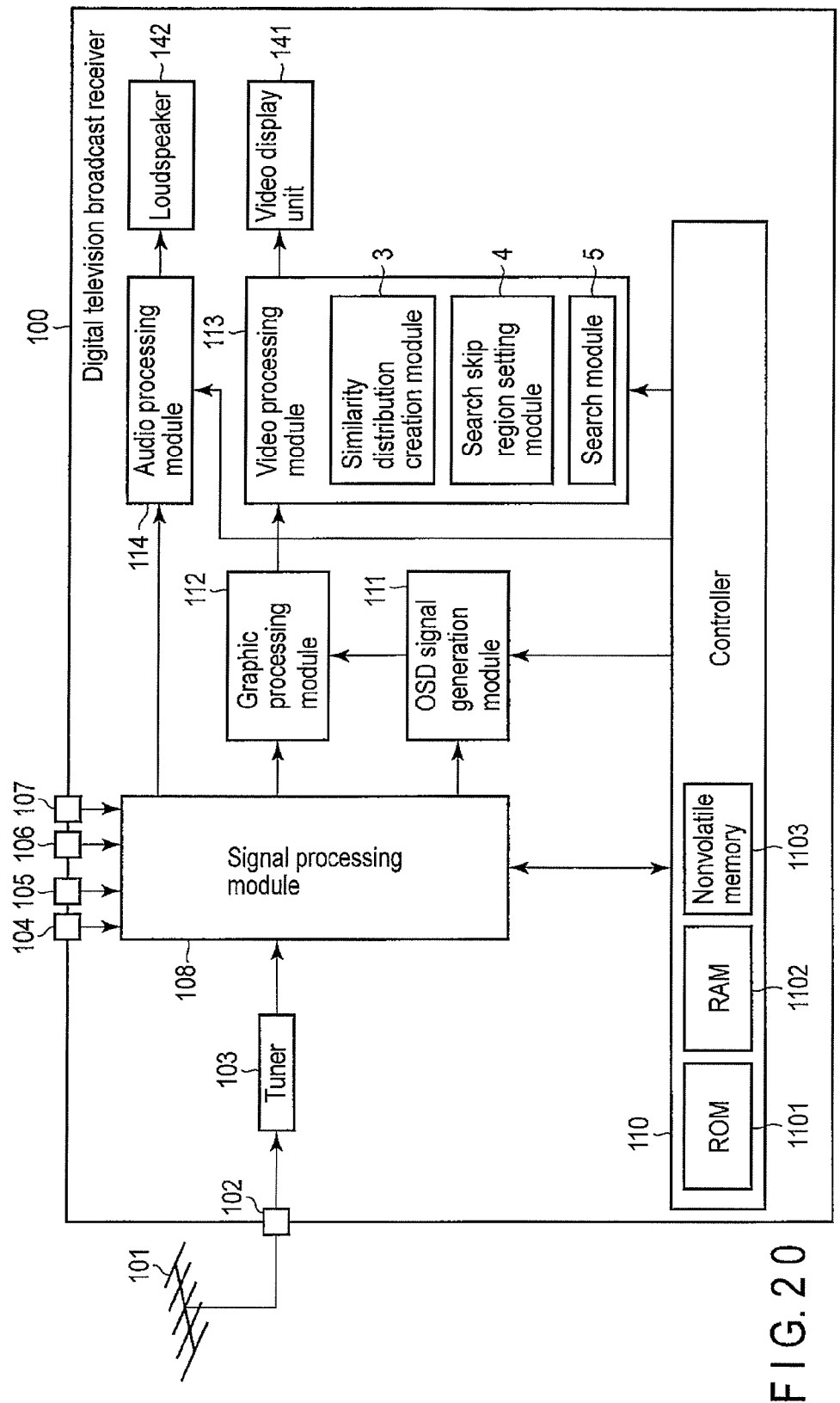
FIG. 20 is a block diagram showing an example of a digital television broadcast receiver to which an object search skip region setting method and object search skip region setting apparatus according to the embodiment are applied.

An application example of the object search skip region setting method and object search skip region setting apparatus according to this embodiment will be described below. FIG. 20 is a schematic block diagram showing an example of the arrangement of a digital television broadcast receiver to which the object search skip region setting method and object search skip region setting apparatus according to this embodiment are applied.

The basic arrangement of a digital television broadcast receiver 100 will be briefly described below. As shown in FIG. 20, the digital television broadcast receiver 100 includes an input terminal 102, a tuner unit 103, an external input terminals 104 to 107, a signal processing module 108, a controller 110, an OSD signal generation module 111, a graphic processing module 112, a video processing module 113, and an audio processing module 114.

A terrestrial digital television broadcast signal received by a terrestrial broadcast receiving antenna 101 is supplied to the tuner unit 103 via the input terminal 102. The tuner unit 103 tunes a signal of a designated channel from the broadcast signal, and outputs that signal to the signal processing module 108. The signal processing module 108 separates video and audio signals from the tuned signal of the designated channel, outputs the video signal to the graphic processing module 112, and outputs the audio signal to the audio processing module 114.

The graphic processing module 112 superimposes an on-screen display (OSD) signal generated by the OSD signal generation module 111 on the video signal, as needed, and outputs that video signal. The graphic processing module 112 can also selectively output the video signal from the signal processing module 108 and the OSD signal from the OSD signal generation module 111.

The video signal output from the graphic processing module 112 is supplied to the video processing module 113. The video signal processed by the video processing module 113 is supplied to a video display unit 141. The video display unit 141 displays an image based on the video signal. The audio processing module 114 converts the audio signal into an analog audio signal that can be output from a loudspeaker 142, and outputs the converted signal to the loudspeaker 142.

The digital television broadcast receiver 100 is systematically controlled by the controller 110. The controller 110 is configured by, for example a central processing unit (CPU), which controls the operations of the respective modules upon reception of signals (various instructions) from, for example, a remote controller. Also, the controller 110 includes a read-only memory (ROM) 1101 which stores control programs to be executed by the CPU, a random access memory (RAM) 1102 which provides work areas to the CPU, and a nonvolatile memory 1103 which stores, for example, various kinds of setting information and control information.

For example, the aforementioned video processing module 113 includes the similarity distribution creation module 3, search skip region setting module 4, and search module 5 shown in FIG. 6. The search module 5 generates a plurality of object search target reduced-scale images having different size ratios from an input image (program image), applies search processing based on similarity computation to the respective object search target reduced-scale images, and sends information of the detected similarities, positions, and scales to the search skip region setting module 4 as needed. The search skip region setting module 4 sets a search skip region on the first object search target reduced-scale image of the plurality of object search target reduced-scale images based on the search skip region setting function, and also sets search skip regions on the remaining object search target reduced-scale images using the information of the size ratios of the object search target reduced-scale images. The search module 5 conducts an object search for an excluded region obtained by excluding the search skip region from each object search target reduced-scale image, and can detect an object from each object search target reduced-scale image.

The significance of detection of an object from each object search target image, that is, an input image will be briefly explained below. The video processing module 113 has a function of converting, for example, a two-dimensional (2D) image into a three-dimensional (3D) one (2D/3D conversion). For example, in the 2D/3D conversion processing, a 2D image is analyzed to detect each object such as a person in the 2D image and to detect an anteroposterior relation (depth) of that object. The object is deformed as needed to generate a 3D image. The aforementioned object detection can be applied to such 2D/3D conversion processing.

The video processing module 113 has an image quality enhancement function which enhances the image quality of an input image. For example, the image quality enhancement processing includes super-resolution processing. Super-resolution processing converts a low-resolution (first-resolution) image signal to a high-resolution (second-resolution) image signal by estimating new pixel values on the basis of the first-resolution image signal in order to increase the number of pixels. With such super-resolution processing, for example, an object is detected, and a super-resolution processing effect may be emphasized or de-emphasized depending on the type of object. The aforementioned object detection can be applied to such image quality enhancement processing.

Note that object detection is not limited to applications to the aforementioned 2D/3D conversion processing and image quality enhancement processing, but it can be applied to various kinds of image processing that require object detection. That is, the aforementioned object search skip region setting method can be applied to the aforementioned 2D/3D conversion processing and image quality enhancement processing, and can also be applied to various kinds of image processing.

This embodiment will be summarized below.

The search skip region setting function generation method of this embodiment associates a template used to search a first model reduced-scale image of a plurality of model reduced-scale images having different size ratios for an object with a designated search point on the first model reduced-scale image, and detects a designated search point similarity between the designated search point and template. Furthermore, when the designated search point similarity exceeds an object detection determination threshold, this method detects surrounding point similarities between the template and a plurality of surrounding search points around the designated search point on the model reduced-scale image.

Moreover, this method measures a frequency (a frequency or number) of similarities on the first model reduced-scale image based on the distribution of the surrounding search point similarities, and generates a similarity distribution on the first model reduced-scale image based on the frequency. In addition, the method computes associations of positions based on a ratio between the first model reduced-scale image and a second model reduced-scale image, measures a frequency of similarities at respective relative positions with reference to the associated positions on the second model reduced-scale image, and generates a similarity distribution on the second model reduced-scale image based on the frequency. Note that "estimation of relative positions" or "estimated relative positions" means not to decide a certain position but to estimate an existence range.

Also, this method generates a search skip region setting function as a function of size ratios, relative positions, and similarities based on a designated search error ratio and the similarity distribution at relative positions on each model reduced-scale image.

The object search method of this embodiment generates a plurality of object search target reduced-scale images designated with scales from an object search target image, computes similarities by applying a template while changing a position on a first object search target reduced-scale image, sets a search skip region on each object search target reduced-scale image based on the detected similarities and the search skip region setting function, and conducts an object search by skipping similarity computation for the set search skip region.

According to at least one embodiment described above, the search skip region setting function generation method, search skip region setting method, object search method, search skip region setting function generation apparatus, search skip region setting apparatus, and object search apparatus, which can improve the object search efficiency, can be provided.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A search skip region setting function generation method comprising:

associating a template used to search for an object with a designated search point on each of model reduced-scale images having different size ratios, and detecting a designated point similarity between the template and the designated search point on each model reduced-scale image;

detecting, when the designated search point similarity exceeds an object detection determination threshold, surrounding search point similarities between the template and a plurality of surrounding search points around the designated search point on each model reduced-scale image; and estimating a distance between the object and the template based on a high-low frequency of the surrounding search point similarities, estimating a detection error ratio of the object at a first surrounding search point based on the estimated distance, comparing an allowable detection error ratio that allows a detection error of the object with the estimated detection error ratio, and generating a function required to set a region where the estimated detection error ratio are less than the allowable detection error ratio as the search skip region of the object.

2. A search skip region setting method using the function generated by the method of claim 1, comprising:
associating the template with a first reference point on a first object search target reduced-scale image of a plurality of object search target reduced-scale images having different size ratios based on the generated function;
setting, when a similarity between the template and a predetermined region including the first reference point on the first object search target reduced-scale image is lower than a threshold, a first search skip region on the first object search target reduced-scale image based on the first reference point; and
setting a second search skip region on a second object search target reduced-scale image based on a first size ratio between the first object search target reduced-scale image and the second object search target reduced-scale image.

3. The method of claim 2, further comprising:
setting a second coordinate value of a second reference point required to set the second search skip region on the second object search target reduced-scale image based on a first coordinate value of the first reference point and the first size ratio.

4. The method of claim 3, further comprising:
setting a size of the second search skip region based on a first similarity between the first reference point and the template.

5. The method of claim 4, further comprising:
setting the second reference point corresponding to the first reference point on the second object search target reduced-scale image based on the first coordinate value and the first size ratio; and
setting the size of the second search skip region, which is set with reference to the second reference point, based on the first similarity.

6. The method of claim 2, further comprising:
prioritizing search skip region setting processing for the first object search target reduced-scale image having a smallest size of the plurality of object search target reduced-scale images over the search skip region setting processing for the remaining object search target reduced-scale images.

7. An object search method using the method of claim 2, comprising:
setting the first search skip region on the first object search target reduced-scale image;
setting the second search skip region on the second object search target reduced-scale image;
searching an excluded region obtained by excluding the first search skip region from the first object search target reduced-scale image for the object; and
searching an excluded region obtained by excluding the second search skip region from the second object search target reduced-scale image for the object.

8. A search skip region setting function generation apparatus comprising:
a first detector configured to associate a template used to search for an object with a designated search point on each of model reduced-scale images having different size ratios, and to detect a designated point similarity between the template and the designated search point on each model reduced-scale image;
a second detector configured to detect, when the designated search point similarity exceeds an object detection determination threshold, surrounding search point similarities between the template and a plurality of surrounding search points around the designated search point on each model reduced-scale image; and
a generator configured to estimate a distance position between the object and the template based on a high-low frequency of the surrounding search point similarities, to estimate a detection error ratio of the object at a first surrounding search point based on the estimated distance, comparing an allowable detection error ratio that allows a detection error of the object with the estimated detection error ratio, and to generate a function required to set a region where the estimated detection error ratio are less than the allowable detection error ratio as the search skip region of the object.

9. A search skip region setting apparatus using the function generated by the apparatus of claim 8, comprising:
a setting module configured to associate the template with a first reference point on a first object search target reduced-scale image of a plurality of object search target reduced-scale images having different size ratios based on the function, to set, when a similarity between the template and a predetermined region including the first reference point on the first object search target reduced-scale image is lower than a threshold, a first search skip region on the first object search target reduced-scale image based on the first reference point, and to set a second search skip region on a second object search target reduced-scale image based on a first size ratio between the first object search target reduced-scale image and the second object search target reduced-scale image.

10. An object search apparatus using the apparatus of claim 9, comprising:
a search module configured to set the first search skip region on the first object search target reduced-scale image, to set the second search skip region on the second object search target reduced-scale image, to search an excluded region obtained by excluding the first search skip region from the first object search target reduced-scale image for the object, and to search an excluded region obtained by excluding the second search skip region from the second object search target reduced-scale image for the object.

11. A search skip region setting function generation method comprising:
associating a template used to search for an object with a designated search point $(x, y)$ on each of model reduced-scale images having different size ratios, and detecting a designated point similarity between the template and the designated search point $(x, y)$ on each model reduced-scale image;
detecting, when the designated search point similarity exceeds an object detection determination threshold, degrees of surrounding search point similarities between the template and a plurality of surrounding search points $(x+xR, y+yR)$ around the designated search point on each model reduced scale image; and
generating a function to set a search skip region to skip search for the object by obtaining a distribution of the surrounding search point similarities relative to relative coordinates $(xR, yR)$ representing the surrounding search points (x+xR, y+yR) with the designated search point (x, y) as a reference point, based on the degree, and executing processing for cumulatively adding of the distribution of the surrounding search point similarities from a smallest value.

12. A search skip region setting function generation apparatus comprising:

a first detector configured to associate a template used to search for an object with a designated search point on each of model reduced-scale images having different size ratios, and to detect a designated point similarity between the template and the designated search point on each model reduced-scale image;

a second detector configured to detect, when the designated search point similarity exceeds an object detection determination threshold, degrees of surrounding search point similarities between the template and a plurality of surrounding search points (x+xR, y+yR) around the designated search point on each model reduced scale image; and a generator configured to generate a function to set a search skip region to skip search for the object by obtaining a distribution of the surrounding search point similarities relative to relative coordinates (xR, yR) representing the surrounding search points (x+xR, y+yR) with the designated search point (x, y) as a reference point, based on the degree, and executing processing for cumulatively adding of the distribution of the surrounding search point similarities from a smallest value.

* * * * *